(No Model.)
G. NOLIN.
SCYTHE.
No. 598,387.  Patented Feb. 1, 1898.
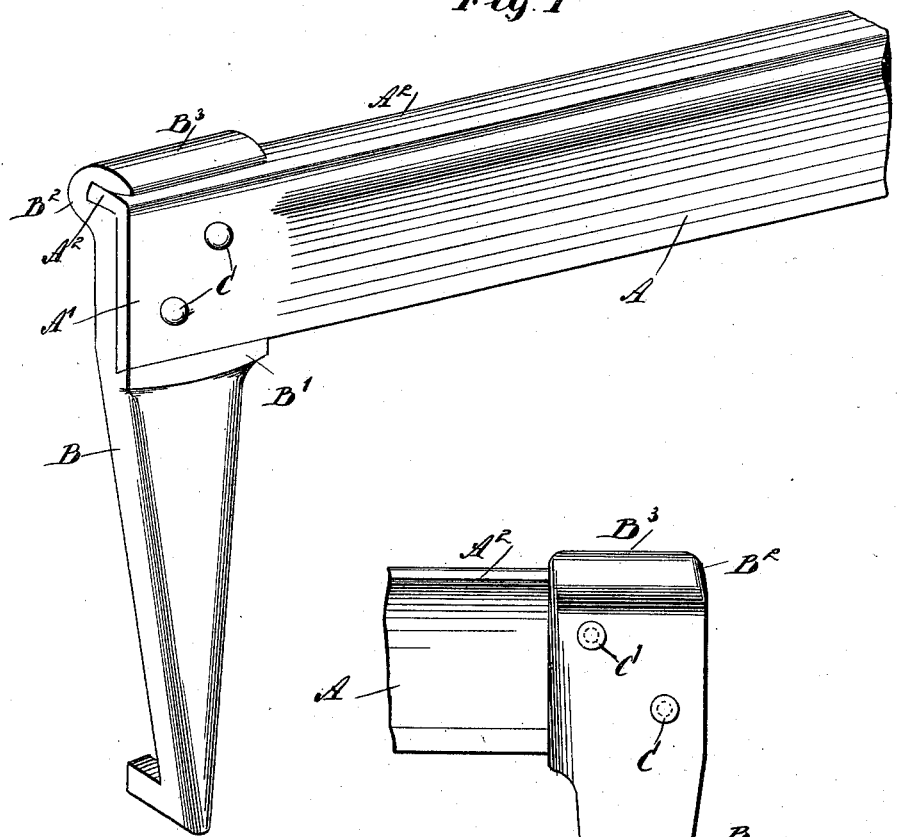
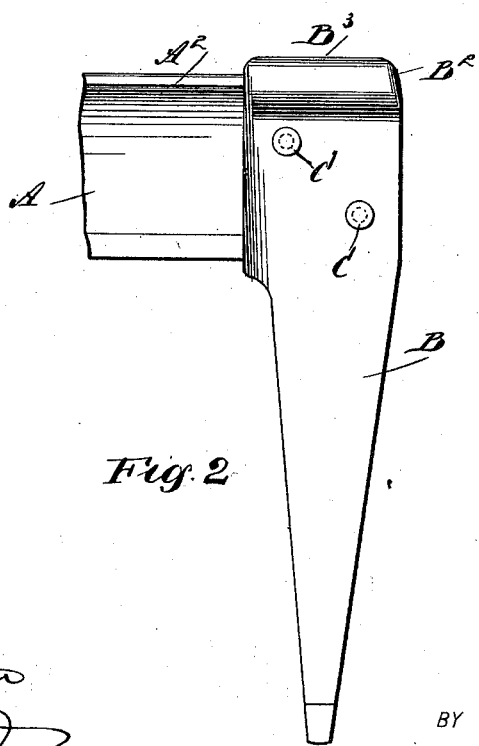
WITNESSES:
INVENTOR
BY
ATTORNEYS.

UNITED STATES PATENT OFFICE.

GERVAIS NOLIN, OF SKOWHEGAN, MAINE.

SCYTHE.

SPECIFICATION forming part of Letters Patent No. 598,387, dated February 1, 1898.

Application filed August 9, 1897. Serial No. 647,615. (No model.)

*To all whom it may concern:*

Be it known that I, GERVAIS NOLIN, of Skowhegan, in the county of Somerset and State of Maine, have invented certain new and useful Improvements in the Manufacture of Edged Tools, of which the following is a full, clear, and exact description.

The object of the invention is to provide certain new and useful improvements in the manufacture of edged tools, such as scythes and the like, whereby tools of a uniform quality are produced, the tools combining lightness with stiffness to render the same very serviceable when in use.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1 is a perspective view of the improvement, and Fig. 2 is a rear face view of part of the same.

In the manufacture of so-called "solid-steel" or "all-steel" scythes as heretofore practiced three pieces of metal of different composition were employed—namely, a piece of hard iron—that is, iron with a very small percentage of carbon—for the main portion of the scythe, a piece of high-grade or crucible steel to form the edge, and a piece of low-grade steel to form the back, all three pieces being welded together to form the scythe.

So far as is now known two or more pieces of steel cannot be welded together by the ordinary means to form an available homogeneous piece of metal for edged-tool purposes, and hence a real all-steel or solid-steel scythe is a misnomer for the article now manufactured and sold as such. In order, however, to produce a real all-steel scythe, I proceed as follows: A piece of cast-steel is rolled or forged to the proper shape for a scythe-blade A, and after attaching a heel B the blade is properly hardened and tempered to produce a good cutting edge having the desired resistance.

It is well known that the oftener the steel is heated the more liable it is to lose its value; but in my process for the manufacture of scythes as above described the steel is heated but a few times and to a lesser degree than was possible under the old method above referred to.

It is evident that by my process the quality of the steel is preserved, and consequently high-grade tools of a uniform quality are produced.

The heel B is formed with a flat face for the end A' of the blade A to rest on, the inner edge of the blade abutting in the dovetail shoulder B' of the heel. Suitable rivets C or other means, such as welding, brazing, &c., are employed to securely fasten the heel and blade together. The back of the blade is formed with a rib $A^2$, which extends transversely and is engaged by a socket $B^2$, formed on the heel, the top $B^3$ of the socket being bent over the top of the back, as is plainly shown in the drawings.

Having thus fully described my invention, I claim as new and desire to secure by Letters Patent—

1. As a new article of manufacture, an edged tool such as a scythe &c., consisting of a blade having a ribbed back, the blade being formed from one piece of cast-steel and homogeneous in composition at its edge, back and body and a heel secured to the blade and having a socket to receive the rib of the back, substantially as shown and described.

2. A scythe having a blade with a ribbed back and a heel having a socket for receiving the rib of the back, substantially as shown and described.

3. A scythe having a blade formed at its back with a rib, and a heel formed with a shoulder for the edge of the blade to rest on, the heel being formed with a socket for receiving the rib of the back, substantially as shown and described.

4. A scythe having a blade formed at its back with a rib, and a heel formed with a shoulder for the edge of the blade to rest on, the heel being formed with a socket for receiving the rib of the back, and means for fastening the heel to the blade, as set forth.

5. A scythe having a blade formed at its back with a rib and a heel formed with a flat face for the end of the blade to rest on and having a dovetail shoulder engaged by the edge of the blade, the said heel being also formed with a socket to receive the said rib of the back, the top of the socket being bent over the top of the back, substantially as shown and described.

GERVAIS NOLIN.

Witnesses:
ED. P. PAGE,
FRANK A. NOLIN.